United States Patent
Abadi et al.

(10) Patent No.: US 11,429,699 B2
(45) Date of Patent: Aug. 30, 2022

(54) SYSTEMS AND METHODS FOR AUTHENTICATION OF A USER BASED ON FREE TEXT

(71) Applicant: International Business Machines Corporation, Armonk, NY (US)

(72) Inventors: Eden Abadi, Rishon Letsion (IL); Itay Hazan, Beer Sheva (IL)

(73) Assignee: International Business Machines Corporation, Armonk, NY (US)

( * ) Notice: Subject to any disclaimer, the term of this patent is extended or adjusted under 35 U.S.C. 154(b) by 281 days.

(21) Appl. No.: 16/846,440

(22) Filed: Apr. 13, 2020

(65) Prior Publication Data

US 2021/0319084 A1   Oct. 14, 2021

(51) Int. Cl.
*G06F 21/31*   (2013.01)
*G06N 20/00*   (2019.01)

(52) U.S. Cl.
CPC .......... *G06F 21/316* (2013.01); *G06N 20/00* (2019.01)

(58) Field of Classification Search
CPC .............................. G06F 21/316; G06N 20/00
See application file for complete search history.

(56) References Cited

U.S. PATENT DOCUMENTS

| | | | |
|---|---|---|---|
| 8,134,449 B2 | 3/2012 | Wu, Jr. | |
| 8,489,635 B1 * | 7/2013 | Phoha | G06F 21/316 713/184 |
| 9,268,927 B1 | 2/2016 | Phoha | |
| 10,440,019 B2 | 10/2019 | Deutschmann | |
| 2010/0036783 A1 * | 2/2010 | Rodriguez | H04L 9/3226 706/15 |
| 2013/0263240 A1 | 10/2013 | Moskovitch | |
| 2016/0006720 A1 * | 1/2016 | Spaulding | H04L 63/0838 726/8 |
| 2016/0269395 A1 * | 9/2016 | Spaulding | G06F 21/31 |
| 2019/0220583 A1 | 7/2019 | Douglas | |
| 2019/0332876 A1 | 10/2019 | Khitrov | |

FOREIGN PATENT DOCUMENTS

| | | |
|---|---|---|
| CN | 110443012 A | 11/2019 |
| EP | 2919422 A1 | 9/2015 |
| EP | 2477136 B1 | 4/2018 |
| WO | 2013006071 A1 | 1/2013 |

\* cited by examiner

*Primary Examiner* — Tongoc Tran
(74) *Attorney, Agent, or Firm* — G.E. Ehrlich (1995) Ltd.

(57) ABSTRACT

There is provided a computer implemented method of authenticating a user, comprising: receiving a sequence of key-related events of a manually typed text by a user using a keyboard, extracting a plurality of sub-features from the sequence of key-related events, for each instance of a plurality of instances of a respective n-gram of a plurality of n-grams extracted from the text, computing a plurality of statistical features for each respective n-gram from the plurality of sub-features extracted for the plurality of instances of the respective n-grams, feeding the plurality of statistical features computed for each of the plurality of n-grams into a trained machine learning (ML) model, and triggering a security process when the ML model outputs an indication of non-authentication of the user.

20 Claims, 4 Drawing Sheets

SYSTEMS AND METHODS FOR AUTHENTICATION OF A USER BASED ON FREE TEXT

BACKGROUND

The present invention, in some embodiments thereof, relates to user authentication and, more specifically, but not exclusively, to systems and methods of authentication of a user based on free text typed by the user.

Accessing sensitive systems such as of governmental, financial and healthcare, remotely, through the internet, became a norm to our everyday routine. One of the most common authentication methods, when trying to detect and prevent unauthorized access, is still passwords. However, using passwords has its vulnerabilities which are exploited by malicious entities seeking to gain unauthorized access to the secure systems. For example, one type of attack is done by remotely stealing usernames and passwords and entering the systems on other users' behalf.

SUMMARY

According to a first aspect, a computer implemented method of authenticating a user, comprises: receiving a sequence of key-related events of a manually typed text by a user using a keyboard, extracting a plurality of sub-features from the sequence of key-related events, for each instance of a plurality of instances of a respective n-gram of a plurality of n-grams extracted from the text, computing a plurality of statistical features for each respective n-gram from the plurality of sub-features extracted for the plurality of instances of the respective n-grams, feeding the plurality of statistical features computed for each of the plurality of n-grams into a trained machine learning (ML) model, and triggering a security process when the ML model outputs an indication of non-authentication of the user.

According to a second aspect, a system for authenticating a user, comprises: at least one hardware processor executing a code for: receiving a sequence of key-related events collected during text manually typed by a user using a keyboard, extracting a plurality of sub-features from the sequence of key-related events, for each instance of a plurality of instances of a respective n-gram of a plurality of n-grams extracted from the text, computing a plurality of statistical features for each respective n-gram from the plurality of sub-features extracted for the plurality of instances of the respective n-grams, feeding the plurality of statistical features computed for each of the plurality of n-grams into a ML model, and triggering a security process when the ML model outputs an indication of non-authentication of the user.

According to a third aspect, computer program product for authenticating a user, comprises: a non-transitory memory storing thereon code for execution by at least one hardware process, the code including instructions for: receiving a sequence of key-related events collected during text manually typed by a user using a keyboard, extracting a plurality of sub-features from the sequence of key-related events, for each instance of a plurality of instances of a respective n-gram of a plurality of n-grams extracted from the text, computing a plurality of statistical features for each respective n-gram from the plurality of sub-features extracted for the plurality of instances of the respective n-grams, feeding the plurality of statistical features computed for each of the plurality of n-grams into a ML model, and triggering a security process when the ML model outputs an indication of non-authentication of the user.

In a further implementation form of the first, second, and third aspects, the plurality of sub-features are computed for a combination of at least one key-related event selected from the group consisting of: press-to-release, release-to-press, press-to-press, and release-to-release.

In a further implementation form of the first, second, and third aspects, the plurality of sub-features comprise an end to end delta time feature (E2E) computed as delta time between a press of a first key of the respective n-gram and a release of a last key of the respective n-gram.

In a further implementation form of the first, second, and third aspects, the plurality of sub-features comprise a character delta time feature (EC) computed as the delta time for each character key-related event of the respective n-gram.

In a further implementation form of the first, second, and third aspects, the plurality of sub-features comprise a regular delta time feature (RDT) computed as the press-to-release delta time for each pair of characters of the respective n-gram.

In a further implementation form of the first, second, and third aspects, the plurality of sub-features comprise an all combinations feature (AC) computed as any combination of a first key-related event and a second key-related event time for all pairs of characters of the respective n-gram.

In a further implementation form of the first, second, and third aspects, the plurality of sub-features comprise an all character delta time feature (ACDT) computed as press-to-release delta time for each of the characters of the respective n-gram.

In a further implementation form of the first, second, and third aspects, the plurality of sub-features comprise a first delta time feature (FDT) computed as the first key-related event in the respective n-gram.

In a further implementation form of the first, second, and third aspects, the plurality of sub-features comprise a last delta time feature (LDT) computed as last key-related event in the respective n-gram.

In a further implementation form of the first, second, and third aspects, the plurality of statistical features are selected from the group consisting of: standard deviation, mean, median, minimum value, and maximum value.

In a further implementation form of the first, second, and third aspects, the n-grams are set by analyzing a training text to determine most frequently occurring n-grams.

In a further implementation form of the first, second, and third aspects, the text is free text having an unknown and non-predicted value prior to being entered by the user.

In a further implementation form of the first, second, and third aspects, the receiving, the extracting, the computing, and the feeding are dynamically iterated for text being dynamically entered by a user, for continuous authentication of the user.

In a further implementation form of the first, second, and third aspects, the security process comprises banning the user from the system.

In a further implementation form of the first, second, and third aspects, further comprising: when the ML model outputs an indication of authentication of the user, iterating the receiving, the extracting, the computing, and the feeding for another text.

In a further implementation form of the first, second, and third aspects, the text is segmented using a plurality of sequential overlapping windows, wherein the receiving, and the extracting, are performed for each one of those windows with respect to the key related events in the window, and wherein the plurality of statistical-features for each respective n-gram are computed by aggregating the plurality of sub-features for each respective n-gram extracted from each of the plurality of overlapping windows.

In a further implementation form of the first, second, and third aspects, the ML model is one of: (i) a customized ML model created for each respective user authentication of a plurality of users, wherein the ML model is trained on a training dataset including a plurality of features extracted for a plurality of n-grams of a training text manually typed by the respective user, labelled with an indication of the respective user, (ii) a ML model designed for identification each of a plurality of users, wherein the ML model is trained on a training dataset including a plurality of features extracted for a plurality of n-grams of a training text manually typed by each respective user of the plurality of users, and labeled with an indication of the respective user of the plurality of users, and (iii) a ML model designed for estimating one or more parameters of the user, wherein the ML model is trained on a training dataset including a plurality of features extracted for a plurality of n-grams of a training text manually typed by each of a plurality of sample users, labelled with one or more parameters of the respective user.

In a further implementation form of the first, second, and third aspects, the n-gram is a consecutive substring of size n characters extracted from the text.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION

Figure 1:
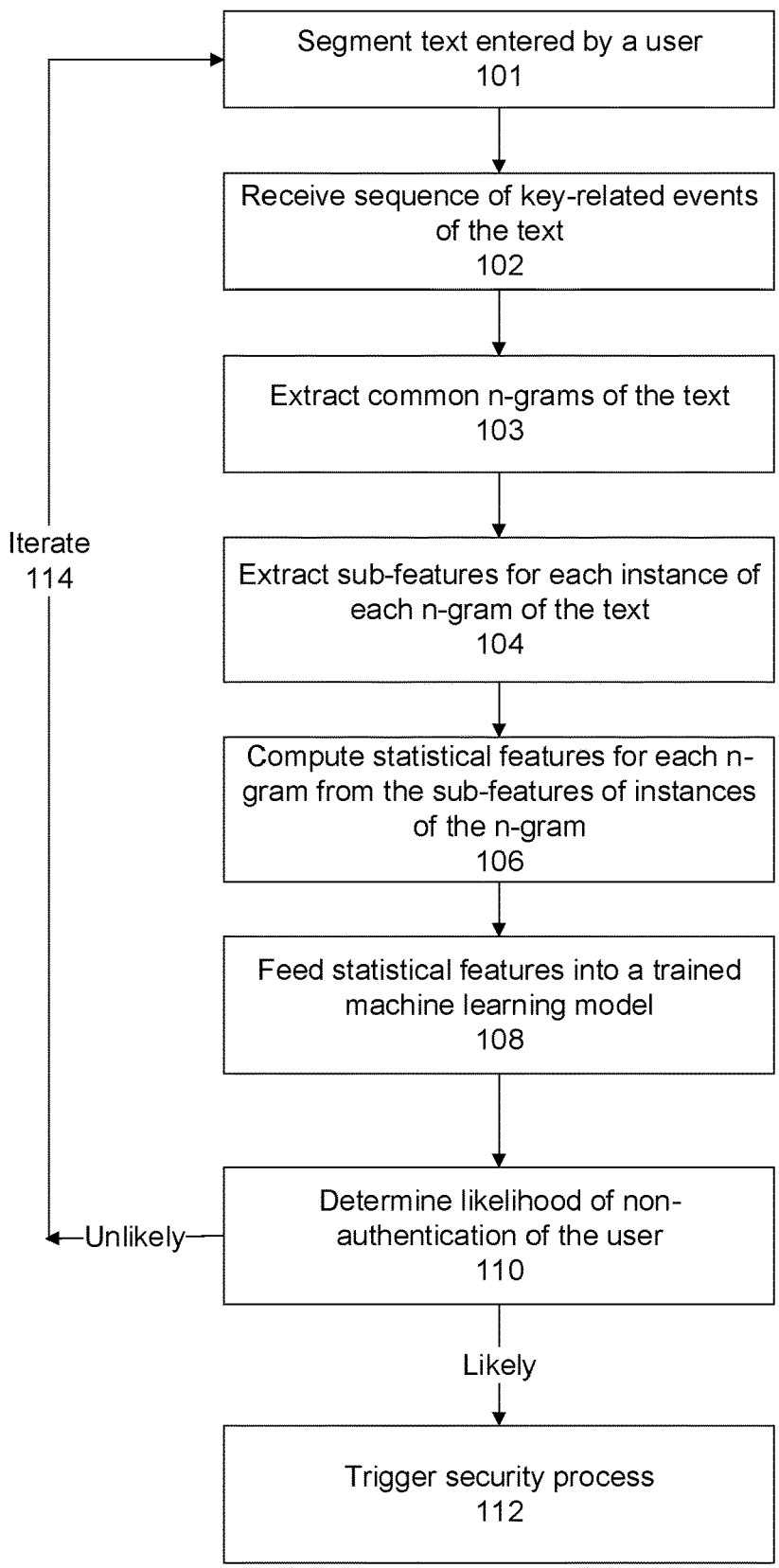
FIG. 1 is a flowchart of a method of authenticating a user based on text entered by the user, in accordance with some embodiments of the present invention.

The present invention, in some embodiments thereof, relates to user authentication and, more specifically, but not exclusively, to systems and methods of authentication of a user based on free text typed by the user.

An aspect of some embodiments of the present invention relate to systems, methods, an apparatus, and/or code instructions (stored in a memory and executable by one or more hardware processors) for authenticating a user based on manually typed text entered by a user using a keyboard. A sequence of key-related events of the manually typed text is received. Each key-related event may be a value indicative of an elapsed amount of time. The key-related events are generated based on manual interaction of the user with the keyboard, for example, based on time stamps associated with signals generated by the interaction of the user with keys of the keyboard. The time value is computed according to the time intervals. Exemplary key-related events include one or more of press-to-release, release-to-press, press-to-press, and release-to-release, and combinations of the aforementioned. Sub-features are extracted from the sequence of key-related events. Sub-features are extracted for each instance of multiple instances of a respective n-gram of multiple n-grams extracted from the text. An n-gram may refer to a substring (characters, symbols, numbers, spaces, letters) of size n extracted from text. For example, for the sentence "The red car is driven by the driver", multiple different n-grams may be defined, for example, according to word, or according to sequential sets of predefined number of characters. The n-gram (e.g., word) "the" appears two times, i.e., two instances thereof. Sub-features are computed for each instance of "the", and for each of the other n-grams. Statistical features are computed for each respective n-gram from the sub-features extracted for the instances of the respective n-gram. Exemplary statistical features include standard deviation, mean, median, minimum value, and maximum value. Continuing with the above mentioned example, statistical features are computed for the n-gram "the" from the sub-features extracted from both of the instances of the n-gram "the", for example, the mean of a certain sub-feature is computed and provided as a certain statistical feature. The statistical features computed for each of the n-grams are into a trained machine learning model (sometimes referred to herein as "ML model"), for example, a classifier. A security process may be triggered when the ML model outputs an indication of non-authentication of the user.

At least some implementations of the systems, methods, apparatus, and/or code instructions described herein relate to the technical problem of authentication of a user, in particular, dynamic and/or continuous authentication of a user. Such situation may occur, for example, when a malicious entity obtains user credentials of a valid user, and accesses the system using the maliciously obtained user credentials. The system, once provided with the valid user credentials, grants access to the malicious entity without further monitoring. The dynamic and/or continuous authentication of the user, when performed for the user using the valid credentials during use of the system, may authenticated the user as another (in addition to the credential validation) or alternative layer of security. The malicious entity using the valid password to obtain unauthorized access to the system may be detected.

Keystroke dynamics (KD), which rely on the specific user keyboard typing patterns, is being used to perform authentication of the user. The field of KD is usually divided into two types: (i) Fixed text, which relates to verifying the identity of the user using short and repeatable text (e.g., username and password) and (ii) Free text, which relates to verifying the identity of the user based on longer unexpected and/or non-predictable text (e.g. email).

At least some implementations of the systems, methods, apparatus, and/or code instructions described herein improve the technical field of user authentication based on an analysis of keystroke dynamics, in particular, free text keystroke dynamics. Inventors realized that existing approaches of analyzing KD, in particular free text, suffers from a loss of dimensionality of the extracted data used to authentication the user. The loss of dimensionality results in a reduced accuracy in authentication of the user, which may lead to, for example, inability to detect an unauthorized user, or incorrectly labelling a valid user as unauthorized and corresponding triggered consequences (e.g., automatic logout from the system). The loss of dimensionality experienced by existing approaches is due to, for example, failure to consider multiple instances of the same n-gram within a text manually typed by a user that is being analyzed, and/or existing approaches fail to consider combinations of characters of n-grams. In contrast to the existing approaches, at least some implementations of the systems, methods, apparatus, and/or code instructions described herein extract high dimensional features, by extracting multiple sub-features from each instance of each n-gram identified in the text entered by the user, and extracts multiple statistical features for each n-gram based on the multiple sub-features of each of the instances. The statistical features are fed into a trained ML model that outputs an indication of whether the user is authenticated or non-authenticated. The ML model, when trained using high dimensional statistical features, and fed the high dimensional features, outputs the indication with a target accuracy that is higher than achievable using existing approaches.

Standard approaches of analyzing text KD are done using simple features extracted from an evaluation of simple n-graphs on top of common n-grams. An n-graph is the delta time from the first press to last release of a certain n-gram, i.e., a sequence of n consecutive characters (or symbols, numbers, spaces, or other possible elements appearing in text). The n-graph is sometimes referred to herein as press-to-release. An example of an n-gram is 't'. The delta time is the time of the press-to-release, for example, 98 milliseconds. For example, ↓ denotes press and ↑ denotes release, the following triple indicates the time of 623450 when the key 't' was pressed (↓, 't', 623450), and the following triple indicates the time of 623548 when the key 't' was released (↑, 't', 623548). The press to release feature, denoted p2r is computed as the different in times between the previous two triplets. The following triplet represents the press to release feature, for the letter t, as being 98 milliseconds {p2r, "t": 98}. Such approaches do not consider multiple instances of the n-gram in an analyzed portion of text. At least some implementations of the systems, methods, apparatus, and/or code instructions described herein compute statistical features based on the multiple instances of the n-grams in the text portion being analyzed, for authenticating the user.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
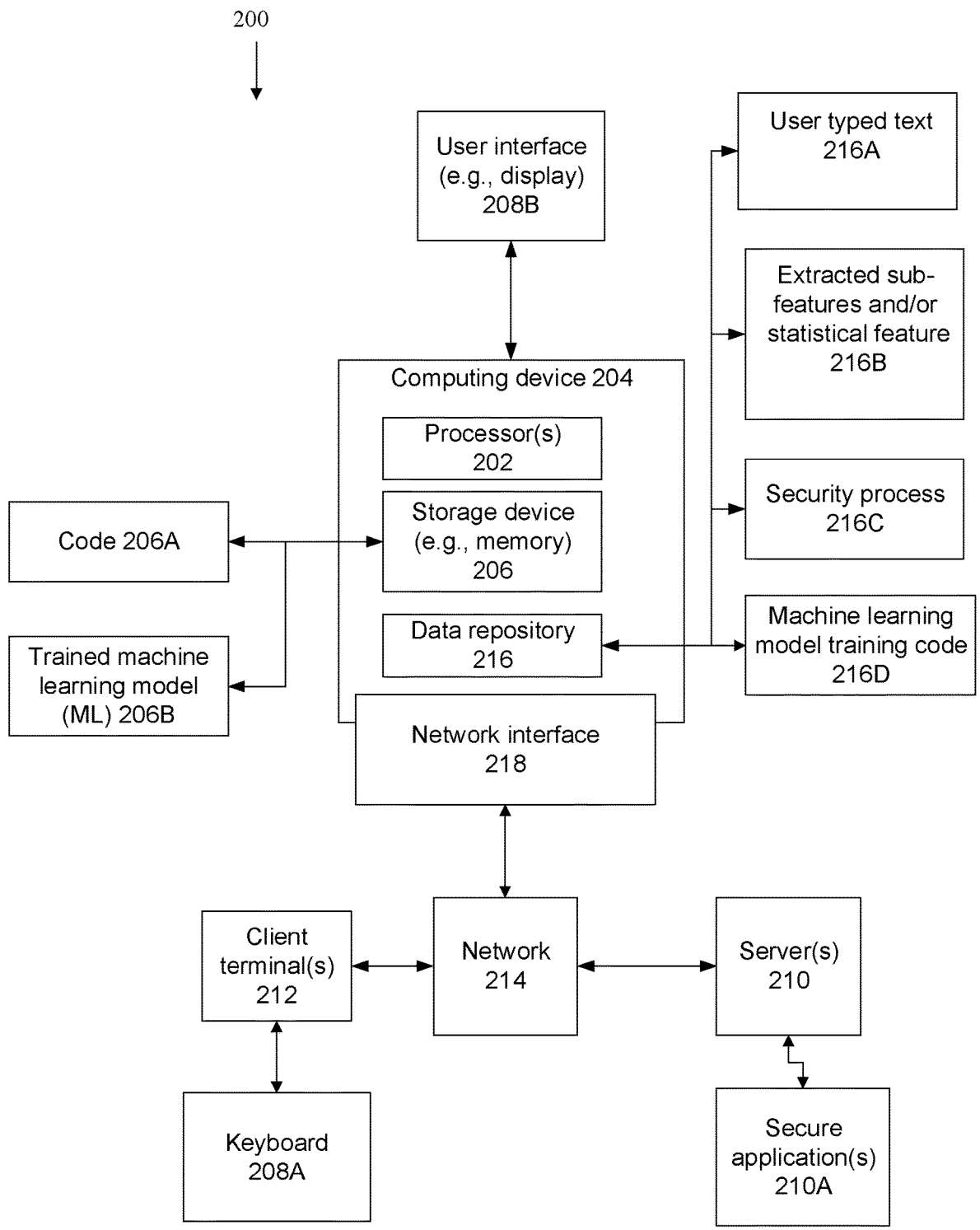
FIG. 2 is a block diagram of a system for authenticating a user based on text entered by the user, in accordance with some embodiments of the present invention.

Reference is now made to FIG. 1, which is a flowchart of a method of authenticating a user based on text entered by the user, in accordance with some embodiments of the present invention. Reference is also made to FIG. 2, which is a block diagram of a system for authenticating a user based on text entered by the user, in accordance with some embodiments of the present invention. System 200 may implement the acts of the method described with reference to FIG. 1, by processor(s) 202 of a computing device 204 executing code instructions 206A and/or 206B stored in a storage device 206 (also referred to as a memory and/or program store).

Computing device 204 may be implemented as, for example, a client terminal, a server, a computing cloud, a virtual server, a virtual machine, a mobile device, a desktop computer, a thin client, a Smartphone, a Tablet computer, a laptop computer, a wearable computer, glasses computer, and a watch computer.

Multiple architectures of system 200 based on computing device 204 may be implemented. In an exemplary implementation, computing device 204 storing code 206A and/or 206B, may be implemented as one or more servers (e.g., network server, web server, a computing cloud, a virtual server) that provides services (e.g., one or more of the acts described with reference to FIG. 1) to one or more servers 210 and/or client terminals 212 over a network 214, for example, providing software as a service (SaaS) to the servers 210 and/or client terminal(s) 212, providing software services accessible using a software interface (e.g., application programming interface (API), software development king (SDK)), providing an application for local download to the servers 210 and/or client terminal(s) 212, and/or providing functions using a remote access session to the servers 210 and/or client terminals 212, such as through a web browser. For example, users use client terminals 212 to access servers 210 over network 214, for example, to access secure applications 210A hosted by server(s) 210. Text entered by a user using a keyboard 208A (e.g., physical keyboard, virtual keyboard presented on a touchscreen) connected to client terminal 212 while accessing secure application 210A is transmitted to computing device 204. The text may be transmitted to computing device 204 by client terminal 212 and/or server 210 and/or another external network connected device that sniffs and/or intercepts network traffic (e.g., a security server and/or computing device 204 itself may intercept and/or sniff the network traffic). Computing device 204 extracts the sub-features and/or statistical features from the text, and feeds the extracts statistical features into ML model 206B, as described herein. Computing device 204 may provide the output of ML model 206B (e.g., to an external administrative security server) and/or may trigger security process 216C accordingly. Such implementation may be used to monitor secure applications 210A for unauthorized use, for example, to detect unauthorized malicious entities that are using another person's email account to send emails. In another implementation, computing device 204 may include locally stored software (e.g., code 206A and/or 206B) that performs one or more of the acts described with reference to FIG. 1, for example, as a self-contained client terminal and/or server. For example, an automated teller machine (ATM) has code 206A and/or 206B installed thereon to catch non-authenticated users during bank account access after the user has used a bank card and code, which may be stolen or used under duress such as at gun point, to access the ATM. In another example, a smartphone of a user has code 206A and/or 206B installed thereon to catch authorized users of the smartphone (e.g., while sending chat messages).

It is noted that training the ML model 206B and/or implementing the ML model 206B may be performed by computing device 204 and/or by another device. For example, the extracted features are transmitted by computing device 204 to the other device for analysis by feeding into ML model 206B stored on the other device. In another example, ML model 206B is trained by the other device, and provided for local storage and/or use by computing device 204.

Processor(s) 202 of computing device 204 may be implemented, for example, as a central processing unit(s) (CPU), a graphics processing unit(s) (GPU), field programmable gate array(s) (FPGA), digital signal processor(s) (DSP), and application specific integrated circuit(s) (ASIC). Processor(s) 202 may include a single processor, or multiple processors (homogenous or heterogeneous) arranged for parallel processing, as clusters and/or as one or more multi core processing devices.

Data storage device 206 stores code instructions executable by processor(s) 202, for example, a random access memory (RAM), read-only memory (ROM), and/or a storage device, for example, non-volatile memory, magnetic media, semiconductor memory devices, hard drive, removable storage, and optical media (e.g., DVD, CD-ROM). Storage device 206 stores code 206A that implements one or more features and/or acts of the method described with reference to FIG. 1 when executed by processor(s) 202. Storage device 206 may store ML model code 206B, as described herein.

Computing device 204 may include a data repository 216 for storing data, for example, text typed by the user 216A, and/or sub-features and/or statistical features 216B extracted from and/or computed based on the text 216B and/or a security process 216C that executes in response to an indication outputted by ML model 206B that the user is unauthorized and/or code for training the ML model 216D, as described herein. Data repository 216 may be implemented as, for example, a memory, a local hard-drive, virtual storage, a removable storage unit, an optical disk, a storage device, and/or as a remote server and/or computing cloud (e.g., accessed using a network connection).

Network 214 may be implemented as, for example, the internet, a local area network, a virtual private network, a wireless network, a cellular network, a local bus, a point to point link (e.g., wired), and/or combinations of the aforementioned.

Computing device 204 may include a network interface 218 for connecting to network 214, for example, one or more of, a network interface card, a wireless interface to connect to a wireless network, a physical interface for connecting to a cable for network connectivity, a virtual interface implemented in software, network communication software providing higher layers of network connectivity, and/or other implementations. Computing device 204 may connect using network 214 (or another communication channel, such as through a direct link (e.g., cable, wireless) and/or indirect link (e.g., via an intermediary computing unit such as a server, and/or via a storage device) with one or more of:

Server(s) 210 storing secure applications 210A which grant access to authorized users. Secure applications 210A are monitored and protected by computing device 204, as described herein.

Client terminal(s) 212, which may be used by users that enter text into secure applications 210A using keyboard 208A, where the entered text is analyzed for authenticating the user and/or discovering non-authenticated users, as described herein.

Computing device 204 and/or client terminal(s) 212 include and/or are in communication with one or more physical user interfaces 208A-B that include a keyboard for entering the text and/or other data entry mechanisms and/or displays for presentation of data. Exemplary user interfaces 208 include, for example, one or more of, a touchscreen, a display, a keyboard, a mouse, and voice activated software using speakers and microphone.

Referring now back to FIG. 1, at 101, text entered by a user may be segmented. Alternatively, the text is not segmented, but processed in its entirety.

Optionally, the text is segmented using multiple windows, which may be overlapping. The windows may have a common fixed size. A window interval that defines the amount of overlap in neighboring windows may be fixed. In such a case, the sequence of key-related events (as described with reference to 102) and the extraction of sub-features (as described with reference to 104) are performed for each one of the windows with respect to the key related events in the window.

Optionally, the determination of likelihood of non-authentication of the user (as described with reference to 110) is performed by an aggregation of the determined likelihood of each segmentation (e.g., each window). Features described with reference to 102-106 are performed per segmentation window, to compute the statistical-features for each respective n-gram. The statistical features computed for each respective segmentation window may be fed into the ML model (as described with reference to 108) to compute a value indicative of non-authentication per segmentation window. The multiple values indicative of non-authentication per segmentation window may be aggregated to obtain a single likelihood of non-authentication of the user. Examples of aggregation processes include: computing the average of the likelihoods (e.g., when the likelihood is a numerical value such as in the range 0-100%), and/or by majority vote (e.g., when the likelihood is a binary value such as authenticated or non-authenticated).

Alternatively, the statistical-features for each respective n-gram (as described with reference to 106) are computed by aggregating the sub-features for each respective n-gram extracted from multiple windows. For example, the mean of a certain sub-feature is computed for the sub-features extracted from the multiple windows. The statistical features computed for multiple windows may be fed into the ML model (as described with reference to 108) to compute a single indication of authentication for the multiple windows.

At 102, a sequence of key-related events for the text, optionally for the segment of the text, are obtained and/or computed. The key-related events may be obtained, for example, by an analysis of the mechanical action of the key pressing (e.g., for physical mechanical keyboard) and/or an analysis of contact by the user with the touch screen (e.g., for virtual keyboard).

The key-related events may be determined based on a signal indicative of pressing of a certain key and/or a signal indicative of release of the certain key.

Exemplary key-related events include press-to-release, release-to-press, press-to-press, and release-to-release, and combinations of the aforementioned.

The text may be manually entered by a user, for example, an email the user is writing in an email application, a document the user is composing using a word processing program, messages the user is entering into a chat application, search text the user is entering into a web browser, and/or text the user is entering into a short message service application.

The text may be entered by a user by typing using a keyboard. The keyboard may be a standard QWERTY keyboard, and/or other formats may be used. The keyboard may be a physical keyboard (i.e., physical keys that are mechanically pressed and released) and/or a virtual keyboard presented on a touchscreen (i.e., virtual keys that are virtually pressed and released according to contact and non-contact with the touch screen) and/or a virtual keyboard where finger action is monitored (e.g., by an imaging sensor) but not actual contact with a surface takes place and/or where the surface is not a touch sensitive surface (e.g., virtually typing on a table top).

The text may be free text and/or unrestricted text, having an unknown and/or non-predicted value prior to being entered by the user. The free text and/or unrestricted is in contrast, for example, to a user selecting a choice of text from an autocomplete application, a user instructed to type a restricted set of text (e.g., type a password) and/or a user selecting search text using previously entered search texts.

At 103, common n-grams of the text are extracted. Alternatively, all n-grams of the text are extracted.

Optionally, the extracted common n-grams represent the most frequently occurring n-grams. The most frequently occurring n-grams may be identified based on an analysis of a training text and/or stored as a predefined list. The training text may be, for example, historical text entered by the same user during the same session (e.g., previous emails written by the user during the current login session and/or earlier text of the current email), historical text entered by the same user during previous sessions (e.g., previous emails written by the user during previous logins), text entered by other users, and/or other text from other sources (e.g., extracted from an online news site, from an online encyclopedia, and/or from user text posted to an online social network website, such as a personal blog and/or feedback).

Using the most frequently occurring (i.e., common) n-grams may reduce or prevent high numbers of default features (e.g., due to short text and/or different calculated n-grams) and/or high dimensionality. When dealing with fixed text KD, for example, the features dimension is constant and constrained to the length of the typed text. This is not the case in free text KD, where the text is unknown, so the feature dimension is exponential by the number of keys at the keyboard. A limited size of n-grams selected according to the most frequently occurring n-grams may provide a technical solution to this technical problem.

At 104, sub-features are extracted. The sub-features are extracted from the sequence of key-related events.

Sub-features are extracted for each instance (of multiple instances) of each n-gram (of multiple n-grams) of the text. The sub-features may be extracted for the extracted common n-grams of the text. For example, for a paragraph in which the n-gram "the" appears 5 times and the n-gram "and" appears 4 times, sub-features are extracted for each of the 5 instances of the n-gram "the" and optionally stored in a list, and for each of the 4 instances of the n-gram "and" and optionally stored in another list.

One or more (e.g., all) of the following exemplary sub-features are extracted for the multiple instances of the same n-gram, for each one of the n-grams. In the exemplary sub-features below, the press-to-release key-related event serves as one example. One example is provided for clarify and simplicity of explanation. It is clear other examples are possible, as the press-to-release key-related event mentioned in the exemplary sub-features below may sometimes be interchanged with one or more other key-related events (e.g., release-to-press, press-to-press, and release-to-release) to create multiple possible combinations of sub-features.

End to end delta time (E2E) computed as delta time between a press of a first key (e.g., first character and/or symbol) of the respective n-gram and a release of a last key (e.g., last character and/or symbol) of the respective n-gram, for each instance of the n-gram. For example, for the n-gram "the", the difference between the time of pressing "t" and the release of "e".

Character delta time (EC) computed as the delta time for each character key related event (e.g., press-to-release) of the respective n-gram with respect to the location of the character within the n-gram. EC is computed for each instance of the n-gram, and optionally provided as a list for every location. For example, when there are two instance of the n-gram "the" in the text, EC is computed for each one of "t", "h", and "e", for both instances of the n-gram "the". When there are duplicate characters in the n-gram, the EC is computed for each duplicated character. For example, for the n-gram "shuttle", the EC is computed for each one of the characters "s", "h", "u", "t", "t", "l", and "e", where the EC is computed separately for each one of the double "t"s. It is noted that the n-graphs (i.e., delta time from the first press to last release of the n-gram) of each of the two "t"s are included in two different EC features since the EC feature is a combination of the location of the character and the character itself. That is, a different EC feature is computed for the first "t" and for the second "t", since each "t" is in a different location in the n-gram.

Regular delta time feature (RDT) computed as the press-to-release delta time for each pair of characters of the respective n-gram, for each instance of the n-gram, optionally provided as a list. The pairs of characters are not necessarily sequential. For example, for the n-gram "the", RDT is computed for the following pairs: "th", "he", and "te", where the press is for the first of the pair, and the release is for the second of the pair. It is noted that the pair may include two instances of the same character in n-grams that include two instances of the same character, sequentially, or non-sequentially.

All combinations feature (AC) computed as one or more (e.g., any, all) combinations of a first key-related event (e.g., press-to-release) and a second key-related event (e.g., press-to-release) time for all pairs of characters of the respective n-gram, for each instance of the respective n-gram, optionally stored as a list.

All character delta time feature (ACDT) computed as press-to-release delta time for each one of the characters of the respective n-gram, regardless of the location of the character within the n-gram. It is noted that the ACDT which does not consider the location of the character within the n-gram is in contrast to the EC described above which considers the location of the character within the n-gram. The ACDT is computed for each individual key, regardless of the pressed key. The ACDT may be computed as a list of the delta times for all the characters without consideration of the location within the n-gram. For example, for the n-gram "the" p2r delta time for ACDT are provided as a list of all the press-to-release pairs of all characters in the n-gram "the", i.e., "t", "h", "e", "th", "he", and "te".

First delta time feature (FDT) computed as the first key-related event (e.g., press-to-release) in the respective n-gram, for each instance of the n-gram. For example, for the n-gram "the", the p2r of the letter "t", and/or the r2p computed as the difference between the release of the "t" and the press of "h".

Last delta time feature (LDT) computed as last key-related event (e.g., press-to-release) in the respective n-gram, for each instance of the n-gram. For example, for the n-gram "the", the p2r of the letter "e", and/or the r2p computed as the difference between the release of the "h" and the press of "e".

At 106, statistical features are computed for each respective n-gram, using the sub-features extracted for the multiple instances of the respective n-gram. The statistical features may be an indication of a computed distribution of the sub-features. Exemplary statistical features include: standard deviation, mean, minimum value, maximum value, skewness, and kurtosis.

For example, when 5 instances of the n-gram "the" appear in the text, the E2E sub-feature (and/or other sub-features described with reference to 104) are extracted for each instance of "the". The mean (and/or other statistical features) of the E2E computed for the 5 instances of "the" is computed.

At 108, the statistical features computed for each of the n-grams are fed into a ML model. The ML model may output an indication of authentication and/or non-authentication of the user. For example, the ML model may output a binary classification indicative of authentication or non-authentication. In another example, the ML model may output a single classification indicative of non-authentication, and not output anything when the user is authenticated. In another example, the ML model may output a probability value (e.g., range of 0-100%) indicative of likelihood of non-authentication (or indicative of likelihood of authentication).

Optionally, the ML model is a customized ML model created for each respective user authentication. A respective customized ML model is created for customized authentication of each respective user. The customized ML model is trained on a training dataset including sub-features and/or statistical features extracted for multiple n-grams of a training text manually typed by the respective user, labelled with an indication of the respective user.

Alternatively or additionally, the ML model is a multi-user ML model created for authentication of each user of multiple candidate users that may be entering text. A single multi-user ML model is created for authentication of the candidate users. The ML model is trained on a training dataset including sub-features and/or statistical features extracted for multiple n-grams of a training text manually typed by each respective user of the multiple candidate users, and labeled with an indication of the respective user of the multiple candidate users.

Alternatively or additionally, the ML model is designed for estimating one or more parameters of the user. In an example, parameters of the user may be demographic attributes of the user, for example, age, gender, income level, and geographic location. In another example, parameters of the user may be predicted behavior of the user, for example, likelihood of performing malicious actions (e.g., sending profane messages to other users, attempting to steal information such as credit card numbers, and attempting to cause damage to the system). The ML model may be trained on a training dataset including features extracted for n-grams of a training text manually typed by each of multiple sample users, labelled with one or more parameters of the respective user (e.g., labelled with the demographic attribute and/or whether the respective user performed a malicious action).

Examples of trained machine learning methods include one or more of combination of: one or more neural networks of various architectures (e.g., artificial, deep, convolutional, fully connected), Markov chains, support vector machine (SVM), logistic regression, k-nearest neighbor, and decision trees.

At 110, likelihood of non-authentication of the user is determined based on the output of the ML model. For example, according to the classification category outputted by the ML model. In another example, the probability outputted by the ML model is compared to a threshold. Likelihood of non-authentication (or authentication) may be identified when the probability outputted by the ML model is above (or below) the threshold.

When likelihood of non-authentication of the user is determined, the feature described with reference to 112 may be implemented. Alternatively, when likelihood of authentication of the user is determined, the feature described with reference to 114 may be implemented.

Alternatively or additionally, 112 may be implemented based on another output of the ML model described herein. For example, when the ML model outputs an indication of likelihood of malicious behavior predicted for the user, 112 is implemented.

Alternatively or additionally, another action may be triggered based on another output of the ML model described herein. For example, when the ML model outputs an indication of one or more demographic parameters of the user (e.g., demographic profile), an advertisement targeted to the demographic parameter may be presented on the display while the user is entering the text. For example, when the ML model outputs an indication that the user is likely retired, an advertisement targeted towards retirees is presented. In another example, when the ML model outputs an indication that the user is likely living in a larger city, an advertisement targeted towards large city dwellers is presented.

At 112, when likelihood of non-authentication of the user is determined, a security process may be triggered. Exemplary security processes include: banning the user from the system (e.g., current email application, user account on a client terminal), requesting a re-authentication, requesting the user provide another authentication (e.g., presenting a challenge question), and/or sending an alert to an administrative server (e.g., to investigate further).

At 114, when likelihood of authentication of the user is determined, one or more features described with reference to 102-110 are iterated.

The iterations may be dynamically performed in real time, as the user is entering text, for authentication of the user that is substantially continuously performed. For example, each iteration is performed for each sentence the user enters. After the user types each sentence, the user is re-authenticated based on the typed sentence. This protects against, for example, unauthorized users completing text (e.g., in a malicious manner) in an email being written by a user who may have left their email account open, for example, a worker that left their desk for a few minutes.

Various embodiments and aspects of at least some implementations of the systems, methods, apparatus, and/or code instructions as delineated hereinabove and as claimed in the claims section below find support in the following examples.

Examples

Reference is now made to the following examples, which together with the above descriptions illustrate some embodiments of the invention in a non-limiting fashion.

The input text serving as an example is the sentence "The quick brownfox jumps over the lazy dog". The n-gram "the" appears twice in the input text.

The sub-features are extracted based on a press-to-release time determined for each letter of each instance of the n-gram. In the notation below, ↓ is press and ↑ is release.

First occurrence of the n-gram "the": [(↓, "t", 15210), (↑, "t", 15224), (↓, "h", 15235), (↑, "h", 15242), (↓, "e", 15255), (↑, "e", 15265)]

Second occurrence of the n-gram "the": [(↓, "t", 16110), (↑, "t", 16120), (↓, "h", 16127), (↑, "h", 16136), (↓, "e", 16148), (↑, "e", 16160)]

Figure 3A:
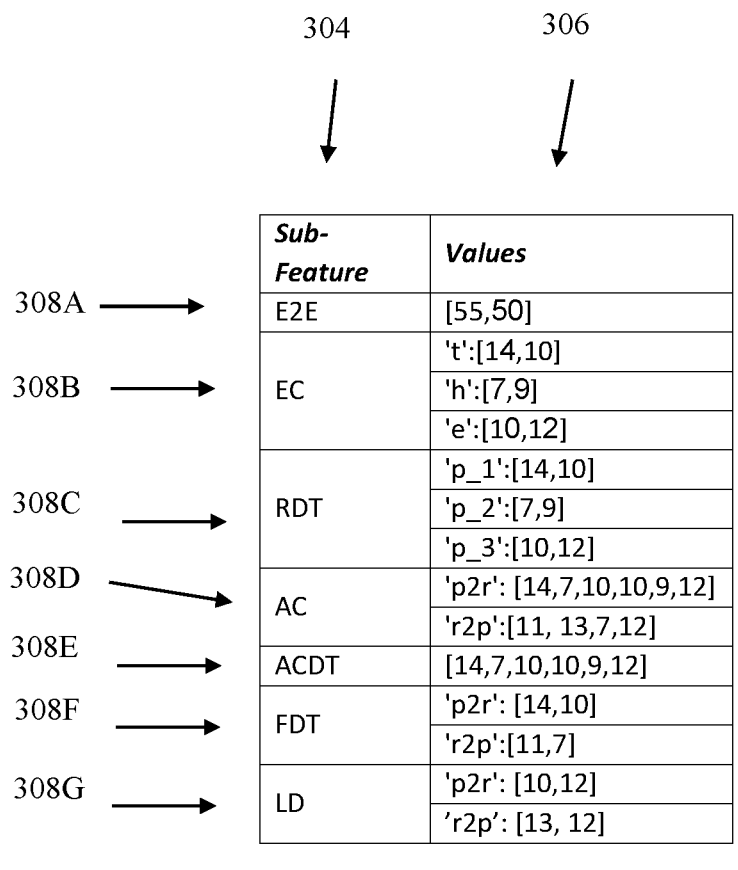
FIG. 3A, is a table summarizing sub-features extracted for the first and second occurrences of the n-gram "the", in accordance with some embodiments of the present invention.

Reference is now made to FIG. 3A, which is a table 302 summarizing sub-features extracted for the first and second occurrences of the n-gram "the", in accordance with some embodiments of the present invention. Column 304 indicates the name of exemplary sub-features, as described herein. Column 306 indicates the values for the sub-features extracted from the first and second occurrence of the n-gram "the", stored as a vector.

Row 308A stores the values [55, 50] for the sub-feature E2E. The value 55 is computed for the first occurrence of the n-gram "the" using the above press-to-release values for the first occurrence, and the value 50 is computed for the second occurrence of the n-gram "the" using the above press-to-release values for the second occurrence.

Row 308B stores values for each character of the n-gram for the sub-feature EC. For the character 't' the value 14 is computed for the first occurrence of the n-gram "the" using the above press-to-release values for the character 't' of the first occurrence, and the value 10 is computed for the second occurrence of the n-gram "the" using the above press-to-release values for the character 't' of the second occurrence.

Similarity values are computed for the sub-features RDT 308C (i.e., for the pairs "th", "he" and "te"), AC 308D, where p2r indicates press to release, and r2p indicates release to press, ACDT 308E, FDT 308F, and LD 308G.

Figure 3B:
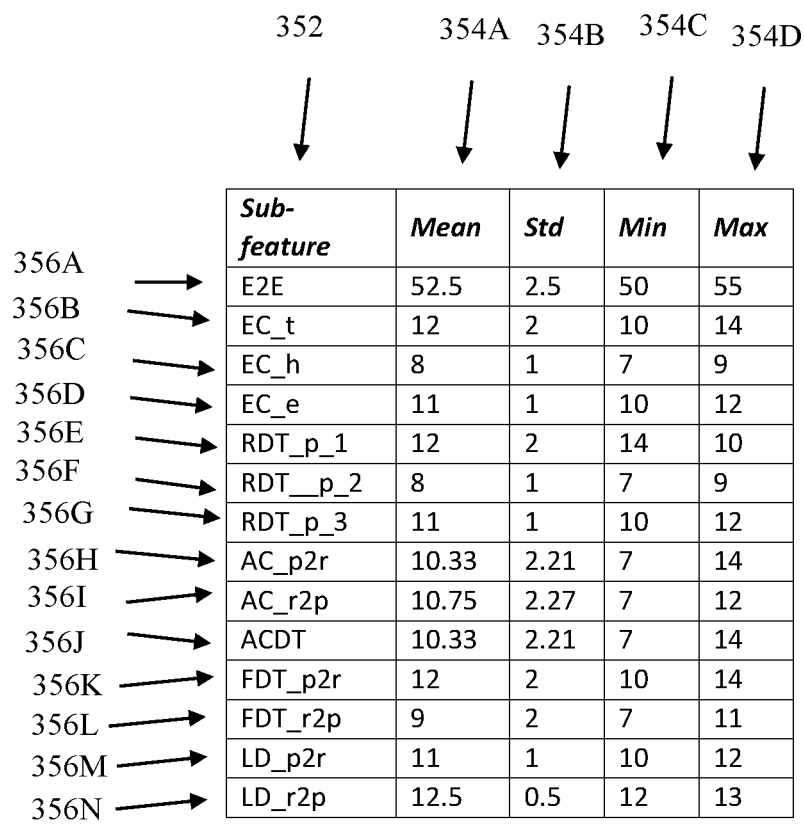
FIG. 3B is a table summarizing statistical features computed for the n-gram "the" using the sub-features of the table of FIG. 3A, in accordance with some embodiments of the present invention.
Figure 3B:

Reference is now made to FIG. 3B, which is a table 350 summarizing statistical features computed for the n-gram "the" using the sub-features of table 302 of FIG. 3A, in accordance with some embodiments of the present invention. Column 352 indicates the name of exemplary sub-features, as described herein. Columns 354A-D indicates the statistical features computed for each sub-feature. Column 354A indicates the mean, column 354B indicates the standard deviation, column 354C indicates the minimum, and column 354D indicates the maximum.

Row 356A stores statistical features computed using the values [55, 50] of the sub-feature E2E presented in row 308A of table 302 of FIG. 3A. For example, the mean value 52.5 (presented in column 354A, row 356A of table 350 of FIG. 3B) is computed as the mean of the values in vector [55, 50] (presented in column 306, row 308A of table 302 of FIG. 3A). Similarly, the standard deviation 2.5, the minimum 50, and the maximum 55, are computed using the values [55, 50].

Row 356B stores statistical features computed using the values [14, 10] of the sub-feature EC for the character "t", presented in row 308B of table 302 of FIG. 3A. Similarly, row 356C stores statistical features computed using the values [7, 9] of the sub-feature EC for the character "h", and row 356D stores statistical features computed using the values [10, 12] of the sub-feature EC for the character "e".

Similarly, rows 356E-G store statistical features computed for the sub-feature RDT, rows 356H-I store statistical features computed for the sub-feature AC, row 356J stores store statistical features computed for the sub-feature ACDT, rows 356K-L store statistical features computed for the sub-feature FDT, and rows 356M-N store statistical features computed for the sub-feature LD.

A total of 56 statistical features are obtained, i.e., 4 statistical features for each of the 14 sub-features. The 56 statistical features are fed into a ML model for outputting an indication of authentication and/or non-authentication of the user, as described herein.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant sub-features and/or statistical features will be developed and the scope of the terms sub-features and/or statistical features are intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A computer implemented method of authenticating a user, comprising:
   receiving a sequence of key-related events of a manually typed text by a user using a keyboard;
   extracting a plurality of sub-features from the sequence of key-related events, for each instance of a plurality of instances of a respective word comprising a plurality of words extracted from the text, wherein each word of the plurality of instances of the word comprises a sequence of consecutive characters, symbols, numbers, spaces, or other possible elements appearing in text and is preceded by and followed by one of a symbol or a space;
   computing a plurality of statistical features for each respective word from the plurality of sub-features extracted for the plurality of instances of the respective word;
   feeding the plurality of statistical features computed for each of the plurality of n-grams into a trained machine learning (ML) model; and
   triggering a security process when the ML model outputs an indication of non-authentication of the user.

2. The method of claim 1, wherein the plurality of sub-features are computed for a combination of at least one key-related event selected from the group consisting of: press-to-release, release-to-press, press-to-press, and release-to-release.

3. The method of claim 1, wherein the plurality of sub-features comprise an end to end delta time feature (E2E) computed as delta time between a press of a first key of the respective word and a release of a last key of the respective word.

4. The method of claim 1, wherein the plurality of sub-features comprise a character delta time feature (EC) computed as the delta time for each character key-related event of the respective word.

5. The method of claim 1, wherein the plurality of sub-features comprise a regular delta time feature (RDT) computed as the press-to-release delta time for each pair of characters of the respective word.

6. The method of claim 1, wherein the plurality of sub-features comprise an all combinations feature (AC) computed as any combination of a first key-related event and a second key-related event time for all pairs of characters of the respective word.

7. The method of claim 1, wherein the plurality of sub-features comprise an all character delta time feature (ACDT) computed as press-to-release delta time for each of the characters of the respective word.

8. The method of claim 1, wherein the plurality of sub-features comprise a first delta time feature (FDT) computed as the first key-related event in the respective word.

9. The method of claim 1, wherein the plurality of sub-features comprise a last delta time feature (LDT) computed as last key-related event in the respective word.

10. The method of claim 1, wherein the plurality of statistical features are selected from the group consisting of: standard deviation, mean, median, minimum value, maximum value, skewness, and kurtosis.

11. The method of claim 1, wherein the words are set by analyzing a training text to determine most frequently occurring words.

12. The method of claim 1, wherein the text is free text having an unknown and non-predicted value prior to being entered by the user.

13. The method of claim 1, wherein the receiving, the extracting, the computing, and the feeding are dynamically iterated for text being dynamically entered by a user, for continuous authentication of the user.

14. The method of claim 1, wherein the security process comprises one of banning the user from the system, requesting a re-authentication of the user, requesting that the user provide another authentication, or sending an alert to an administrative server.

15. The method of claim 1, further comprising: when the ML model outputs an indication of authentication of the user, iterating the receiving, the extracting, the computing, and the feeding for another text.

16. The method of claim 1, wherein the text is segmented using a plurality of sequential overlapping windows, wherein the receiving, and the extracting, are performed for each one of those windows with respect to the key related events in the window, and wherein the plurality of statistical-features for each respective word are computed by aggregating the plurality of sub-features for each respective word extracted from each of the plurality of overlapping windows.

17. The method of claim 1, wherein the ML model is one of:
   (i) a customized ML model created for each respective user authentication of a plurality of users, wherein the ML model is trained on a training dataset including a plurality of features extracted for a plurality of words of a training text manually typed by the respective user, labelled with an indication of the respective user,
   (ii) a ML model designed for identification each of a plurality of users, wherein the ML model is trained on a training dataset including a plurality of features extracted for a plurality of words of a training text manually typed by each respective user of the plurality of users, and labeled with an indication of the respective user of the plurality of users, and (iii) a ML model designed for estimating one or more parameters of the user, wherein the ML model is trained on a training dataset including a plurality of features extracted for a plurality of words of a training text manually typed by each of a plurality of sample users, labelled with one or more parameters of the respective user.

18. The method of claim 1, wherein the word is a consecutive substring of size n characters extracted from the text.

19. A system for authenticating a user, comprising:
at least one hardware processor executing a code for:
receiving a sequence of key-related events collected during text manually typed by a user using a keyboard;
extracting a plurality of sub-features from the sequence of key-related events, for each instance of a plurality of instances of a respective word comprising a plurality of words extracted from the text, wherein the word comprises a sequence of consecutive characters, symbols, numbers, spaces, or other possible elements appearing in text and is preceded by and followed by one of a symbol or a space;
computing a plurality of statistical features for each respective word from the plurality of sub-features extracted for the plurality of instances of the respective word;
feeding the plurality of statistical features computed for each of the plurality of n-grams into a ML model; and
triggering a security process when the ML model outputs an indication of non-authentication of the user.

20. A computer program product for authenticating a user, comprising:
a non-transitory memory storing thereon code for execution by at least one hardware process, the code including instructions for:
receiving a sequence of key-related events collected during text manually typed by a user using a keyboard; extracting a plurality of sub-features from the sequence of key-related events, for each instance of a plurality of instances of a respective word comprising a plurality words extracted from the text, wherein the word comprises a sequence of consecutive characters, symbols, numbers, spaces, or other possible elements appearing in text and is preceded by and followed by one of a symbol or a space;
computing a plurality of statistical features for each respective n-gram from the plurality of sub-features extracted for the plurality of instances of the respective n-grams;
feeding the plurality of statistical features computed for each of the plurality of n-grams into a ML model; and
triggering a security process when the ML model outputs an indication of non-authentication of the user.

* * * * *